United States Patent [19]

Graham

[11] 4,233,809

[45] Nov. 18, 1980

[54] SIZE COMPOSITION FOR GLASS FIBERS

[75] Inventor: Roy R. Graham, Lexington, N.C.

[73] Assignee: PPG Industries, Inc., Pittsburgh, Pa.

[21] Appl. No.: 971,453

[22] Filed: Dec. 20, 1978

[51] Int. Cl.³ .............................................. D02G 3/00
[52] U.S. Cl. ......................................... 57/250; 57/249;
260/29.2 M; 260/32.6 R; 428/389; 428/391;
428/392
[58] Field of Search ............... 428/391, 392, 375, 378,
428/389; 528/26, 28; 57/249, 250; 260/32.6 R,
29.2 M; 427/390 A; 65/3 C

[56] References Cited

U.S. PATENT DOCUMENTS

| 2,531,571 | 11/1950 | Hyde | 428/391 |
|---|---|---|---|
| 3,081,195 | 3/1963 | Biefeld et al. | 428/391 |
| 3,168,389 | 2/1965 | Eilerman | 428/392 |
| 3,424,608 | 1/1969 | Marzocchi et al. | 428/288 |
| 3,676,287 | 7/1972 | Flautt et al. | 428/391 |
| 3,746,738 | 7/1973 | Pepe et al. | 260/32.6 R X |
| 3,869,308 | 3/1975 | Graham | 428/391 X |
| 3,870,547 | 3/1975 | Workman et al. | 428/391 X |
| 3,903,046 | 9/1975 | Greber et al. | 528/26 X |
| 3,922,472 | 11/1975 | Foley et al. | 428/447 X |

*Primary Examiner*—Lorraine T. Kendell
*Attorney, Agent, or Firm*—Kenneth J. Stachel

[57] ABSTRACT

A forming size composition is provided for glass fibers that are to be made into twisted glass fiber strands. The forming size contains about 20 to about 94 weight percent based on the solids of the aqueous forming size of a silylated polyazamide and an emulsifying lubricant in an amount in the range of about 6 weight percent to about 40 weight percent of the solids in the aqueous forming size composition. In the forming size composition the silylated polyazamide is used to replace the starch of a conventional forming sizing composition for twisted glass fiber strands.

21 Claims, No Drawings

SIZE COMPOSITION FOR GLASS FIBERS

BACKGROUND OF THE INVENTION

The present invention relates to a composition for coating glass fibers that are to be twisted and used in textile products.

Twisted glass fiber strands are produced by attenuating streams of molten glass from orifices in a bushing which contains the molten glass. A winder attenuates the stream of molten glass and as the streams of glass cool to produce filaments they are coated with a sizing composition. Then the filaments are gathered together and wound on a package by the winder. In the production of glass fiber strand for textile applications, a large number of streams of molten glass are attenuated through a large number of orifices on a bushing to produce a glass fiber strand that contains many glass fiber filaments. The fiber size composition provides lubrication and protection of the glass fiber filament and even the glass fiber strand to prevent interfilament abrasion both during the wet conditions occurring during fiber attenuation and under the substantially dry conditions of the conversion of glass fiber strand into products and the further fabrication of these products into other products such as cloth.

Glass fiber strands that are produced for textile applications are drawn over numerous guide surfaces at high rates of speed during the twisting, beaming, quilling and weaving operations to produce the glass fiber textile products. Traditionally the size composition used on glass fibers intended to be used in textile applications has been based on starch and/or oil dissolved in an aqueous medium. Typical size composition contain partially or fully dextrinised starch in amounts of about seven percent by weight and a hydrogenated vegetable oil in an amount of around two percent by weight along with cationic wetting agents, emulsifying agents and water. The art has suggested many improvements of this basic size composition. The oils that have been used have been combinations of cationic lubricants, which are soluble in aqueous starch solutions, and nonionic lubricants which appear to break up the starch film-forming materials and help in reducing tensions that are developed when the bundle of fibers is drawn over guide surfaces. Also small amounts of film-formers such as gelatin and polyvinyl alcohol have been added. Even with all the modifications of the basic starch, or oil and starch lubricant size composition, none of the size compositions have fulfilled all the requirements and conditions necessary to produce a twisted glass fiber strand or strands which can be used directly in the fabrication of textile glass fiber products.

Even the traditional size composition for glass fibers that are to be used in textile applications has a processing disadvantage. The starch which provides adhesion between the glass fibers in the strand is not a permanent film former which can protect the fibers during their ultimate usage. Hence the starch must be burned off of the fibers after they have been processed through the weaving operation. The burning process takes place as a heat cleaning operation where the starch is removed from twisted glass fiber strands. The burning process of most starch usually leaves a minor amount of black, objectionable residue on the glass fiber strand, also causes the loss of some of the tensile strength of the glass fibers, and also necessitates a retreating step. In the retreating step the glass fibers are retreated with a more permanent film former which is usually a silane coupling agent to protect the glass fibers during the further processing to produce textile glass fiber products. The heat cleaning is conducted at a temperature of about 1200° to 1400° F. for 30 to 40 seconds and is sufficient to volatilize the solids and remove them from the fabric and to soften the glass fibers in the woven fibric to set them in their new position. The art has made attempts to replace the starch with a synthetic polymer film former because of the greater uniformity of such materials, but synthetic polymers generally suffer from the problem of producing to high of a tension when the bundles of glass fibers are drawn over the guide surfaces. One recent approach to this dilemma of not being able to use a size composition as a protective coating for the glass fibers through the complete process of forming, twisting, quilling, beaming, and weaving to produce textile glass fiber products, is disclosed in U.S. Pat. No. 4,009,317 (Chase et al) wherein a coating material is provided that has improved burnoff properties. Such an approach, however, does not reduce the need of a heat cleaning operation wherein the size composition is burned from the glass fiber strands.

It is also well known in the art that silanes containing an amino group can be used in treating glass fiber to improve the chopp ability of the fibers by making the fibers more brittle.

In U.S. Pat. No. 3,869,308 (Graham) a sizing agent is disclosed for fiber glass strand or yarn to be used for screening applications where the yarn or strand does not have a detrimental cross-sectional flattening. The sizing agent contains a starch, a salt of a polyamino-functional polyamide resin and a carboxylic acid, a wax, and a fatty triglyceride and can contain a silane coupling agent.

It has recently been suggested in U.S. Pat. No. 3,746,738 (Pepe et al) that polyazamides containing silicon moieties are useful as fiber sizers for fibers such as glass fiber, nylon, polypropylene, polyester and other fibers. The use of the fiber size with glass fibers is exemplified by preparing a 50 weight percent methanolic solution of a modified polyazamide as a 0.5 weight percent solids aqueous solution, which is used to impregnate continuous glass roving. The impregnated roving is then dried and chopped into quarter inch discontinuous strands.

It has also recently been suggested in U.S. Pat. No. 4,055,701 (Marsden) to use azido-containing silane compositions as coupling agents to enhance the adhesion of various substrates with a broad variety of polymers. For example a 5 weight percent aqueous azido-silane product solution using 66 grams of gamma-aminopropyltriethoxysilane and 67 grams of 3-(azido-sulfonylbenzoic acid) is used to coat water—sized fiber glass virgin roving and the treated fiber glass strand is then dried and chopped into one quarter inch long strand.

The object of the present invention is to provide a forming size for use on glass fibers to be used in producing twisted glass fiber yarn that provide the desired protection and tension needed during the operation of forming, twisting, quilling, beaming, and weaving and that reduce the necessity of burning off the size composition from the twisted glass fiber yarn after the yarn is woven.

Another object of the present invention is the provision of a forming size composition for use in producing twisted glass fiber yarn that substantially alleviates the necessity of burning off the non-permanent film forming oil composition of a typical sized formulation and retreating the heat cleaned yarn or fabric with a composition containing a coupling agent.

A further object of the present invention is to provide a forming size composition for use in producing twisted glass fiber yarn that performs the function of film former and coupling agent and that gives flexibility to the glass fibers enabling the glass fibers to be twisted and that need not be removed from the twisted glass fiber yarn since the size composition bonds with the glass and with most chemical polymer and resin compositions.

SUMMARY OF THE INVENTION

According to the present invention, it has been discovered suprisingly that a silylated polyazamide can be used in a forming size composition for glass fibers without making the glass fiber strands too brittle and to allow twisting of the glass fiber strand. The silylated polyazamide act as both a film former and coupling agent in the size composition, and reduces the need for burning off the size composition from twisted glass fiber yarn before or after weaving. It also reduces the necessity of retreating a heat cleaned glass fiber with a coupling agent compatible with most chemical resin compositions.

The present invention includes a forming size composition, an improved twisted glass fiber yarn and method of making same. The forming size composition comprises a silylated polyazamide and an external emulsifiable lubricant. The amount of silylated polyazamide used is similar to the amount of starch used in a starch oil size composition, since the silylated polyazamide is replacing the starch. The amount of lubricant is at least about 0.20 weight percent or about 6 weight percent on a solids basis. The improved twisted glass fiber yarn and method of making same involve a glass fiber strand to which the size composition of silylated polyazamide and external emulsifiable lubricant have been added when the strand was formed from molten glass.

Since the silylated polyazamide is available in a 50 percent solution, the amount of active silylated polyazamide generally is about half that of the amount of starch used in a size composition.

By forming size composition it is meant that the size composition is applied to glass fiber strands during their formation. The amount of size placed on the glass fiber strand is usually less than the amount of a starch oil size composition, placed on the strand, but the same amount could be added although no extra benefits would be derived. Also the aqueous forming size composition of the present invention usually has a lower solids content than conventional starch oil sizes. Once again the same solids content could be used but without deriving any additional benefits. While a certain amount of drying of the sized strands will occur during the forming procedure, the sized strands are "conditioned" further in air or in an oven (dried for about 20 hours at a temperature of about 75° C.) to reduce the average moisture content of the strand before it is twisted. The strand is twisted and may be quilled, beamed or woven without heat cleaning the twisted glass fiber strand or woven product.

DETAILED DESCRIPTION OF THE INVENTION

In a conventional forming size for glass fibers that are to be twisted and are to be used in textile applications, the principal components are a starch and an oil. The starch acts as a non-permanent film former and the oil acts as a lubricant. The forming size coats the glass fibers and protects them from inter-fiber or inter-filament abrasion in the glass fiber strand when the strand is processed especially through twisting. Then when the twisted glass fiber yarn is woven, the starch must be removed from the yarn, since it is only a temporary film former and does not couple with the glass and other chemicals that might be applied to the woven glass fiber yarn. After the starch is removed a coupling agent is applied to the glass fiber yarn to attach to the yarn and to attach to any chemical to be applied later to the yarn. The coupling agents of the current day like silanes are known to give a degree of brittleness to the glass fibers. These coupling agents have been used in forming sizes for just that purpose.

Before the present invention, those skilled in the art continued to use starch in forming sizes for twisted textile yarn and only added coupling agents to forming sizes for untwisted glass fiber yarn, or to treating formulations for twisted glass fiber yarn that has been heat cleaned to remove the starch of the forming size, or to a forming size for twisted glass fibers in conjunction with the starch. Before the present invention, the art considered it unthinkable to use a coupling agent in a forming size without the presence of starch to be used on glass fibers to be twisted. Hence, I found it surprising that a certain type of coupling agent in combination with a minimum amount of an external, emulsifiable lubricant can totally replace the starch in a forming size for glass fiber that will undergo twisting.

The type of coupling agent useful in the forming size of the present invention that is used on glass fibers that undergo twisting is the silylated polyazamides. These compounds are described in U.S. Pat. No. 3,746,738 (Pepe et al) hereby incorporated herein as polyazamide polymers which contain at least secondary nitrogen groups in their backbone where a silane group is pendently or internally bonded to the polyazamide moiety. The polyazamide moiety comprises a polycarboxamide containing secondary nitrogen atoms therein, which are separated from the carbonyl moieties of the carbamide groups by divalent alkylene groups containing one to three, inclusive, saturated carbon atoms, and has a nitrogen to carbonyl mole ratio of at least 1.5 and not exceeding about 26. Each bonded silicon atom of the silane is bonded through a carbon atom of an organic group which is directly bonded to a nitrogen atom of the polyazamide by a carbon to nitrogen bond. The remaining free valences of each silicon group are bonded to at least one of a monovalent organic radical by a carbon to silicon bond to form the silane, which in turn is bonded to another silane group. The weight of the pendent silane groups do not exceed twice the weight of the polyazamide moieties and comprises at least 0.25 weight percent of the total weight of the compound. These compounds may be formed by a Michael addition method or a haloalkylation method, where one of the reactants in forming the polyazamide contains the silane group or silicon bonded thereto. The silane can also be incorporated in the ammonolysis (amidation) reaction to form the polyazamide structure or it can also be incorporated by post treating a polyazamide. This is accomplished by reacting a functional organic silicon compound or silane with a polyazamide. These silylated polyazamides are described more fully in U.S. Pat. No. 3,746,738 where the silicon moiety is the functional organic silicon compound for post treatment is a silane or where the reaction includes a reactant containing a silicon bonded thereto that later forms a silane. These silylated polyazamide compounds are available from Union Carbide Corporation, New York under the names of Y-5922, Y-5923, Y-5986 and Y-5987, and may be used individually or in a mixture. Some of these compounds are available in only small scale production samples.

The external emulsifiable lubricant useful in the forming size composition, improved twisted glass fiber yarn and method of making same of the present invention are typically vegetable oils which have been hydrogenated. A typical vegetable oil would be hydrogenated cottonseed oil, hydrogenated corn oil, hydrogenated soybean oil and the like.

If the lubricant is not self-emulsifiable an emulsifying agent can be added to the lubricant. Non-exclusive examples of suitable emulsifiers include fatty acid sulfonates, polyglycol esters of fatty acids, polyhydric alcohol esters of high molecular weight mineral organic acids, fatty acid alkylol amines, sorbitan monostearate, sorbitan monooleate, and acid ester of a polyethylene glycol, and preferably Tween ® 81 ethylene oxide derivative of a sorbitol ester.

In addition, if desired, other known additives for size compositions for glass fibers can be added to the primary components of the size composition of the present invention. Examples of these addititives include various textile softeners, non-ionic wetting agent, a fungicide, a plasticizer, additional coupling agents like silane and siloxane material and hydroxy containing metal salts of a strong mineral acid such as, for example, a basic chromium chloride or basic chromium sulfate etc. and Werner type complex compounds. In addition other glass lubricants can be added in addition to the external emulsifiable lubricant and these include compounds such as alkyl imidazoline derivatives. Any plasticizers that are employed in the sizing composition would be employed to lessen the brittleness of the strand and to improve end finding of the strand. An example of a plasticizer is Carbowax ® 300 which is a polyethylene glycol with an average molecular weight of 300. If desired the polyethylene glycol can be employed in conjunction with a water soluble polyvinyl alcohol in the size composition. This is often desirable because of the added film strength properties imparted by the combination of polyethylene glycol and polyvinyl alcohol in the sizing composition. In addition an anti-foaming agent can be added to the size formulation and an example of such an agent is SAG-470 which is an anti-foam emulsion prepared from a silicone oil, filler, and an emulsion stabilizer in water solution and is available from Union Carbide Corporation.

In the preferred embodiment of the present invention the silylated polyazamide, which is used, is the Union Carbide Corporation silylated polyazamide Y-5922. In an alternative embodiment the silylated polyazamides from Union Carbide Corporation denoted as Y-5986, Y-5923 and Y-5987 may be used. These compounds have similar physical properties such as a clear liquid appearance, dissolved in a 50 percent methanol solution, although any lower alkyl solvent may be used, and having a viscosity under 200 centipoise and a specific gravity at 25° C. of 0.95 to 0.98 and can be diluted with water, alcohol, polar solvents and 5 percent aqueous solutions are stable for not less than 24 hours. The amount of the silylated polyazamide used in the sizing composition is generally the same amount as the amount of starch used in an aqueous size solution, but the polyazamide exists in a 50% methanol solution so actually the amount of the silylated polyazamide is about half the amount of starch usually used in a size composition. An aqueous size solution on a solids basis usually contains 28 to 96 percent by weight of solids of a starch. The aqueous size solution of the present invention on a solids basis would contain an amount of silylated polyazamide solution of about 20 weight percent to about 94 weight percent (about 3 to about 6 weight percent per 10 gallons (37.85 liters) of aqueous forming size on a wet basis).

The external emulsified lubricant that is preferably used in the aqueous forming size composition of the present invention is a hydrogenated corn oil such as Pureco oil and most preferably a hydrogenated soybean oil. The amount of the lubricant that is used must be at least about 6 weight percent based on the solids in the aqueous-forming size composition. This amount is critical and the use of amounts less than about 6 weight percent or equivalent will not be enough to protect the glass fibers from breakage. Preferably the amount of lubricant used is in the range of about 6 weight percent to about 40 weight percent based on the solids in the aqueous forming size composition (about 0.12 to about 1.4 weight percent per 10 gallon (37.85 liters) of aqueous forming size composition). More than 40 weight percent of the lubricant could be used but with higher amounts, there are increased chances of not obtaining proper conditions for using the sized glass fibers for polymer reinforcement. The preferred amount of lubricant for the best performance is in the range of about 7 to about 20 weight percent based on the solids in the aqueous forming size composition. To emulsify the lubricant it is preferred to use an ethylene oxide derivative of a sorbitol ester, for example, Tween ® 81. The emulsifying agent is generally added in any amount known to those skilled in the art for emulsifying the aforementioned lubricants, but preferably the amount of emulsifying agent added is in the range of about 0.05 to about 6 weight percent of the solids in the aqueous forming size composition (about 0.04 to about 0.2 weight percent per 10 gallons of the aqueous forming size composition).

Another preferred additive added to the aqueous forming size composition of the present invention is an anti-foaming agent such as an anti-foam emulsion prepared from a silicon oil, filler, and emulsion stabilizer in water solution such as SAG-470 available from Union Carbide Corporation, New York. The anti-foaming agent is added usually in the amount of about 0.01 to about 0.4 weight percent based on the amount of solids in the aqueous forming size composition (around 0.01 weight percent per 10 gallon of aqueous forming size composition).

Typically, the overall solids content of the aqueous forming size composition can vary from about 2 to about 8 percent by weight. It should be noted that the solids content can be adjusted in accordance with the desired solids content for the specific forming conditions employed. Generally, the solids content will range from 2.5 to about 5 percent by weight. By solids content it is meant the residual solids remaining after the sizing composition is dryed at 105° C. to a constant weight.

The following procedure is preferably used in mixing the aqueous forming size composition of the present invention. The desired or preferred amount of silylated polyazamide is mixed with a sufficient amount of acidic acid or other organic acid to control the pH around neutral for the addition of the desired or preferred amount of silylated polyazamide to be added to water. The mixture of silylated polyazamide in acidic acid is then added to about 1.5 gallons of water in a mix tank at room temperature and atmospheric pressure. In another premix tank the external emulsifiable lubricant preferably any vegetable oil hydrogenated to a iodine value of around 70 and most preferably soybean oil is the vegetable oil for economic reasons is added along with Tween 81 ® emulsifying agent in the desired or preferred amounts with agitation. The premix tank is operated at room temperature and atmospheric pressure while agitation is continued by means of an Eppenbach mixer. The mixture is allowed to homogenize under agitation with the Eppenbach mixture for about 30 minutes. Then the Pureco Oil ®—Tween 81 ® emulsion is added to the tank containing the aqueous solution of silylated polyazamide and acidic acid along with the desired amount of anti-foaming agent preferably SAG 470. Then this mixture is diluted to 10 gallons with water. Any additional additives needed, for example to provide compatibility with various polymers, may be added just before dilution.

The aqueous forming sizing composition is applied to the glass fibers from an applicator during their formation. The filaments are gathered into a strand by means of a gathering shoe and then wound on a forming tube carried on the surface of a rotating drum-type winder to produce a forming package. The collet on which the forming package rides can be rotated at any revolution known to those skilled in the art and the spiral directing the strand onto the forming package can be operated in accordance with standard operating procedures. The applicator can be a belt-type applicator or pad type applicator or any applicator known to those skilled in the art to be useful for applying a size to glass fibers. After the winding is completed, the forming package is preferably air dried. The amount of size on the glass fiber strand should be around 0.15 to about 0.4 percent loss in weight of the glass fiber strand when the sized glass fiber strand is burned. This is a well known technique (LOI) for determining the amount of size on glass fibers. This burning is an analytical technique and does not constitute a process step in using the sized glass fiber strands of the present invention. Lesser quantities of size may be used on glass fiber strands with a diameter smaller than G-75 glass fiber strand. Use of quantities less than 0.15 percent LOI should be avoided since the glass fiber strands may not be adequately protected. After conditioning in air a single end is found. This untwisted strand is unwound onto a bobbin, the forming package and the bobbin being mounted on a twist frame. During the unwinding and rewinding step, a twist is imparted to the strand which provides integrity for subsequent processing. When the twisted strand or yarn is to be used for textile applications one standard process that may be employed to prepare the yarn is referred to as beaming. This involves mounting a plurality of bobbins on racks. Then the ends of each bobbin is threaded through one or more tensioning disc and through a plurality of guide eyes, over a separating comb and onto a beam which is a large cylinder. The plurality of yarn ends are wound on this beam in parallel.

The glass fiber strands sized with the silylated polyazamide-containing size composition of the present invention have excellent behavior in reinforced polymers. Polymers with which the silylated polyazamide composition sized glass fibers of the present invention may be used include: polyesters, acrylics, polyolefins, cellulose acetates, and nitrates, alkyls, vinylchloride, vinylacetate and polyamides and the like thermoplastic polymers. One polymer with which the sized glass fibers of the present invention have been most compatible are the epoxy polymers.

The invention will be elucidated further by the following examples.

EXAMPLE I

An amount of 60 milliliters of acetic acid was combined with 1500 grams of a silylated polyazamide obtained from Union Carbide Corporation having the name of Y-5987. This mixture was then added to 1.5 gallons (5.7 liters) of water. In a separate mixing vessel 500 grams of Pureco ® Oil was combined with 75 grams of Tween ® 81 emulsifying agent to produce an emulsion. Then the emulsion along with 5 grams of SAG ® 470 were added to the aqueous solution of acetic acid and silylated polyazamide and the mixture was diluted to 10 gallons (37.9 liters) to produce an aqueous forming size which will hereinafter be referred to as Sample 1.

EXAMPLE II

An amount of 60 milliliters of acetic acid was combined with 2,000 grams of a silylated polyazamide obtained from Union Carbide Corporation having the grade name Y-5922 which is a 50 percent silylated polyazamide in methanol solution and this mixture was added to 1.5 gallons (5.7 liters) of water. In a separate vessel 300 grams of Pureco ® Oil was mixed with 50 grams of Tween ® 81 to produce an emulsion. The emulsion along with 5 grams of an anti-foaming agent SAG ® 470 were added to the aqueous solution of acetic acid and silylated polyazamide and the mixture was diluted to 10 gallons (37.9 liters) to produce an aqueous forming size hereinafter referred to as Sample 2.

EXAMPLE III

An amount of 70 milliliters of acetic acid were combined with 2,000 grams of a silylated polyazamide obtained from Union Carbide Corporation under the name of Y-5922 which is a 50 percent solution of silylated polyazamide in methanol. This mixture was then added to 1.5 gallons (5.7 liters) of water. In a separate mixing vessel 100 grams of Pureco ® Oil was combined with 15 grams of Tween ® 81 to form an emulsion. Then in another separate mixing vessel 150 grams of gamma-methacryloxypropyltrimethoxysilane is combined with 5 milliliters of acetic acid. Then the emulsion and the silane acetic acid mixture and 5 milliliters of an anti-foaming agent SAG 470 are added to the aqueous solution of acetic and silylated polyazamide. Then this mixture is diluted to 10 gallons (37.9 liters) to present an aqueous forming size hereinafter referred to as Sample 3.

EXAMPLE IV

The size composition of Example I was applied to G 75 2/5 glass fiber strand. The forming package was air dried and the size application as determined by loss on ignition of the strand was quite low i.e., 0.32 percent.

EXAMPLE V

The size composition of Example II was applied to G-75 2/5 in the same manner as the size composition of Example I in Example IV. The size application was determined by loss on ignition to be 0.26 percent. The tensile strength of G-75 1/0 0.7 z ranged from 8.74 lb (38.8 newtons) to 9.45 lb (42 newtons). This is a higher tensile strength than usually achieved for glass fibers sized with a conventional starch oil size.

Table 1 presents additional formulations that were prepared in a manner similar to those of Example I, Example II, and Example III. Table 1 also presents results of testing of Samples 1, 2 and 3 and the other samples with regard to their characteristics for producing a good twisted glass fiber yarn.

forming package was operated at 2,300 revolutions per minute. The applicator used was a rotating belt-type applicator rotating at 133 revolutions per minute. After the winding of the forming package was completed the package was air dried. After drying, a single end was found. This untwisted strand was unwound onto a bobbin on a twisting frame. During the unwinding and rewinding step, a twist was imparted into strand to produce G-75 strand that had a construction of 1/0 0.7 z.

The quilling was tested after the winding was completed by counting the number of broken filaments on the surface of the quill. The following rating system was used to judge the character of the quill.

TABLE I

| Sample | Amount of Sil/PAA[1] % of solids | Amount of Lubricant % of solids | Additives and % of solids | Quill Grade | Fuzzballs per MM/E/Yds. | Strand Integrity | Lint Guide Tension/Eyes/Comb | Binder Guide Tension/Eyes/Comb | Comments |
|---|---|---|---|---|---|---|---|---|---|
| 1 | 54 Type Y-5987 | 36 | Acetic Acid 4.3 Tween 81-5.4 SAG .3 | 29/40 | 1.4/0 | C | B/B/B | B/B/B | Solids-3.41 pH-8.71 |
| 2 | 70.7 Type Y-5922 | 21.2 | Acetic Acid 4.2 Tween 81-3.5 SAG .4 | 40/40 | 0/0 | B | B/B/B | B/B/B | Solids-3.59 pH-9.31 |
| 3 Quilling-binder | 74.4 Type Y-5922 | 7.4 Pureco Oil | Acetic Acid 5.6 Tween 81-1.1 A-174 - 11.2 SAG-470 - .4 | 39/40 | 8.7 1.1 | B | D/D/D | B/B/B | Solids-3.63 pH-8.8 accumulation caused tension to run high. |
| 3b | 74.4 | 7.4 | Same | 18.5/40 | — | B | D/D/D | B/B/B | All bobbins flare in Excessive Lint in Tension, Creel and guide eyes. |
| 4 | 54 Type Y-5923 | 36 | Acetic Acid 4.3 Tween 81-5.4 SAG 470-.3 | 19.5/40 | 3.6/0 | B | C/-/C | C/-/C | Solids-3.37 pH-8.51 |
| 5 | 54 Type Y-5986 | 36 | Acetic Acid 4.3 Tween 81-5.4 SAG-470-.3 | 18.0/40 | 4.4/0 | A | C/C/D | C/C/C | Solids-4.81 pH-9.12 |
| 5b | Same | Same | Same | 28/40 | 8.6/0 | A | C/C/D | C/C/C | Solids-Same pH-Same No tension weights |
| 6 | 84.7 Type Y-5922 | 8.5 | Acetic Acid 5.1 Tween 81-1.3 SAG-470-.4 | 30.5/40 | 145.6/0 | B | C/D/D | B/B/B | Solids-2.65 pH-8.11 |
| 7 | 71.2 | 28.5 | SAG-470-.4 | 15/40 | 12.2 | A | D/-/D | B/-/B | Solids-3.08 pH-9.3 |
| 8 | 100 | — | — | — | — | — | —/—/— | —/—/— | Did not twist |

[1]50% silylated polyazamides in methanol solution.

The sizing formulations of Samples 1 through 8 were applied to glass fibers from an applicator during their formation. The temperature of the sizing composition when applied to the glass fibers is usually around 100° F. (37.78° C.). It is preferred that the temperature of the sizing composition be at around 100° F. (37.78° C.) to give better stability of the sizing composition. The filaments are gathered into strands by means of a gathering shoe and then were wound on a rotating drum type winder onto a forming tube. The collet on which the forming package rides was rotated at 4,420 revolutions per minute and the spiral directing the strand onto the

TABLE 2

| | |
|---|---|
| A | 0 to 7 broken filaments |
| A/B | 8 broken filaments |
| B | 9 to 15 broken filaments |
| B/C | 16 broken filaments |
| C | 17 to 26 broken filaments |
| C/D | 27 broken filaments |
| D | 28 or more broken filaments |

An acceptacle grade for quilling of yarn is from A to B. When several quilling grade tests are run on a number of glass fiber yarns the grade letter is assigned a number and the best quill grade is 40 out of 40 points.

The method of determining fuzzballs per million ends per yard (MM/E/yds) involves placing packages of twisted glass fiber strands through tensioning devices where the pulling force is provided by pull rolls in order to simulate warping. Any fuzz on the strands usually builds up at the tensioning devices or the comb until the fuzz breaks away as a fuzzball. These fuzzballs are counted both visually and photometrically to give the number of fuzzballs per million ends per yard of the strands. The lower numbers indicate fewer fuzzballs generated and this is indicative of good quality glass fiber yarn.

The strand integrity is a measure of how well the filaments are held together in the strand by the forming size. The test is a visual observation of a 2 to 3 inch section of the twisted glass fiber strand held by the observer. The observer assigns a letter A, B, C or D to characterize the integrity of the strand. The letter A indicates good integrity and the letters B, C and D decreasing integrity.

Lint shedding is a test simulating the beaming of yarn. The strand from the bobbin was passed through a tensioning disc and two guide eyes and a separating comb and wound on a spool. Twelve such ends were parallel wound simultaneously to form a simulated beam. Also binder shedding was measured in the same manner. The lint shedding and binder shedding were rated as follows:

| | |
|---|---|
| A | None |
| B | Slight |
| C | Readily noticeable |
| D | Excessive. |

The foregoing has described an aqueous forming size composition, improved twisted glass fiber yarn and method of making same wherein the size composition need not be burned off the twisted glass fiber yarn, and there is a reduced need of retreating a heat cleaned glass fiber yarn with a coupling agent compatible with chemical resin compositions, and wherein the forming size composition need not be cooked at elevated temperatures or pressures in a special vessel, and wherein the twisted glass fiber yarn containing the sized composition of the present invention has a dye receptive surface. All of these benefits are accomplished by the forming size, improved twisted glass fiber yarn and method of making same of the present invention wherein silylated polyazamide is used along with at least about 6 weight percent based on the solids of the size composition of an external emulsifiable lubricant as the size composition.

I claim:

1. An aqueous forming size composition for treating glass fibers that are to be made into twisted glass fiber strands wherein the forming size composition gives the glass fiber strand flexibility and abrasion resistance during processing operations to produce woven twisted glass fiber strands, wherein the necessity is reduced for removing the size composition from the woven sized twisted glass fiber strands, consisting essentially of
   (a) silylated polyazamide in an amount in the range of about 20 to about 94 weight percent of the solids in the aqueous sizing composition,
   (b) an emulsifiable lubricant in an amount in the range of about 6 weight percent to about 40 weight percent of the solids in the aqueous sizing composition.

2. Aqueous forming size composition of claim 1 wherein the silylated polyazamide is in a 50 percent solution with a lower alkyl solvent.

3. Aqueous forming size composition of claim 1 or 2 wherein the emulsifiable lubricant is not self-emulsifiable and an emulsifying agent is included in the composition in the amount in the range of about 0.1 to about 10 weight percent of the solids in the aqueous forming size composition.

4. The aqueous forming size composition of claim 3 wherein the lubricant is a hydrogenated soybean oil and the emulsifying agent is an ethylene oxide derivative of a sorbitol ester.

5. Aqueous forming size composition of claim 1 wherein a textile softener is added.

6. An aqueous forming size composition of claim 1 wherein a coupling agent is added.

7. An aqueous forming size composition of claim 1 wherein a non-ionic wetting agent is added.

8. In a method for producing glass fiber strands that are to be twisted, wherein the glass fibers are treated with an aqueous forming size composition having starch and a lubricant, the improvement comprising:
   (a) replacing the starch with silylated polyazamide, and
   (b) combined with the silylated polyazamide at least about 6 weight percent based on the solids in the aqueous forming size composition of an emulsifiable lubricant.

9. A twisted glass fiber strand having the dried residue of an aqueous sizing composition on the fibers in the twisted glass fiber strand, wherein the residue need not be removed from the strand and where the sizing composition consists essentially of:
   (a) silylated polyazamide in an amount in the range of about 20 to about 94 weight percent of the solids in the aqueous sizing composition, and
   (b) an emulsifiable lubricant in an amount of at least about 6 weight percent based on the solids of the size composition.

10. Twisted glass fiber strand of claim 9 wherein the sizing composition has silylated polyazamide in a 50 percent solution with a lower alkyl solvent.

11. Twisted glass fiber strand of claim 9 or 10 wherein the sizing composition has a non-self-emulsifiable lubricant and an emulsifying agent is included in the composition in the amount in the range of about 0.1 to about 10 weight percent of the solids in the aqueous forming size composition.

12. Twisted glass fiber strand of claim 9 or 10 wherein the aqueous forming size composition has a lubricant that is a hydrogenated soybean oil and an emulsifying agent that is an ethylene oxide derivative of a sorbitol ester.

13. Twisted glass fiber strand of claim 9 or 10 wherein the aqueous forming size composition has a textile softener.

14. Twisted glass fiber strand of claim 9 or 10 wherein the aqueous forming size composition has a coupling agent.

15. Twisted glass fiber strand of claim 9 or 10 wherein the aqueous forming size composition has a non-ionic wetting agent.

16. An aqueous forming size composition of claim 1 or 2 having a plasticizer.

17. An aqueous forming size composition of claim 1 or 2 having an additional lubricant.

18. An aqueous forming size composition of claim 1 or 2 having an anti-foaming agent.

19. Twisted glass fiber strand of claim 9 or 10 wherein the aqueous forming size composition has a plasticizer.

20. Twisted glass fiber strand of claim 9 or 10 wherein the aqueous forming size has an additional lubricant.

21. Twisted glass fiber strand of claim 9 or 10 wherein the aqueous forming size composition has an anti-foaming agent.

* * * * *